(12) United States Patent  (10) Patent No.: US 8,222,863 B2
Sakakibara  (45) Date of Patent: Jul. 17, 2012

(54) BATTERY PACK

(76) Inventor: Kazuyuki Sakakibara, Okazaki (JP)

( * ) Notice: Subject to any disclaimer, the term of this patent is extended or adjusted under 35 U.S.C. 154(b) by 274 days.

(21) Appl. No.: 12/816,227

(22) Filed: Jun. 15, 2010

(65) Prior Publication Data

US 2010/0244769 A1 Sep. 30, 2010

Related U.S. Application Data

(63) Continuation-in-part of application No. PCT/JP2008/071632, filed on Nov. 28, 2008.

(30) Foreign Application Priority Data

Dec. 17, 2007 (JP) .................................. 2007-324416

(51) Int. Cl.
H02J 7/00 (2006.01)
H02J 7/02 (2006.01)
(52) U.S. Cl. ......... 320/118; 320/107; 320/111; 320/128
(58) Field of Classification Search .................. 320/118, 320/107
See application file for complete search history.

(56) References Cited

U.S. PATENT DOCUMENTS 7,511,451 B2 * 3/2009 Pierce ............................ 320/103
2007/0024237 A1 * 2/2007 Cole et al. ...................... 320/107
2008/0224661 A1 * 9/2008 Onose ............................ 320/115

FOREIGN PATENT DOCUMENTS

| JP | 2001023589 | 1/2001 |
|---|---|---|
| JP | 2001333547 | 11/2001 |
| JP | 2002254355 | 9/2002 |
| JP | 2004048964 | 2/2004 |
| JP | 2004064977 | 2/2004 |
| JP | 2004112954 | 4/2004 |
| JP | 2004147022 | 5/2004 |
| JP | 2006067782 | 3/2006 |
| JP | 2007229827 | 9/2007 |

* cited by examiner

Primary Examiner — Drew A Dunn
Assistant Examiner — Nathaniel Pelton
(74) Attorney, Agent, or Firm — Schwegman, Lundberg & Woessner, P.A.

(57) ABSTRACT

A battery pack for an electric device is disclosed which includes: a group of battery cells interconnected in series; discharge control circuitry for converting DC voltage of the group into AC voltage; an AC-output terminal through which an output of the discharge control circuitry is supplied to the device; charge control circuitry for converting AC voltage of a commercial power source into DC voltage, to thereby charge the group; and a charging terminal through which electric power of the source is supplied into the group, wherein the AC-output terminal is connectable with a power-input connector of the device, and the charging terminal is connectable with a charging connector of the source, the pack further comprising a detector for detecting insertion of the power-input connector into the AC-output terminal, wherein the discharge control circuitry initiates a discharge control sequence for the group, if the insertion is detected, and does not initiate the discharge control sequence, in response to non-detection of the insertion.

6 Claims, 6 Drawing Sheets

BATTERY PACK

RELATED APPLICATIONS

This application is a continuation-in-part filing of International Patent Application No. PCT/JP2008/071632, filed Nov. 28, 2008 and published on Jun. 25, 2009 as WO 2009/078262, which claims the priority benefit of Japanese Application Serial No. 2007-324416, filed Dec. 17, 2007, the contents of which applications and publication are incorporated herein by reference in their entirety.

BACKGROUND OF THE INVENTION

1. Field of the Invention

The present invention relates to battery packs which are constructed with rechargeable batteries such as Li-ion batteries.

2. Description of the Related Art

An electric device is primarily powered by an AC voltage supplied from a commercial power source, or a DC voltage supplied from battery cells. The above-described electric devices using battery cells as a power source include a type of an electric device, as represented by such as a cellular telephone, which specially fits very small load current applications, and uses a battery pack oriented toward reduction in size and weight, and another type of an electric device, as represented by such as a power tool, which meets the requirements of a large load current, and uses a battery pack oriented toward large current discharging.

An example of such a conventional battery pack is disclosed in Japanese Patent Application Publication No. 2002-254355.

BRIEF SUMMARY OF THE INVENTION

For an electric device using the above-described battery pack which is oriented toward large current discharging, its performance has been improving owing to recent developments in such as battery technologies or charge control process technologies. These conventional technologies, however, require a battery pack to have a voltage far lower than that of the commercial power source, and therefore, there is a need for the use of a larger load current than when the electric device is powered by the commercial power source. For this reason, it is unavoidable to accept a performance drop which results from such as an electric power loss due to the use of a large load current.

On the other hand, for a conventional electric device powered by the commercial power source, to be used where the commercial power source is not available, an appliance such as an engine-driven power generator is used. Unfortunately, its use is limited to business purposes, because of the lack of ease-to-use, the need for increased costs, etc. For this reason, it is very rare to use an electric device powered by the above-described commercial power source for household purposes where the commercial power source is not available.

In view of the foregoing, it would be preferable to provide a battery pack which can be carried and transported to where the commercial power source is not available, for potential household purposes, which is inexpensive and easy to be handled, and which can output power at a level which is comparable to that of the commercial power source.

According to some aspects of the invention, a battery pack usable as a power source for an electric device is provided.

This batter pack comprises:

a battery cell group in which a plurality of battery cells are interconnected in series;

discharge control circuitry for converting DC voltage of the battery cell group into AC voltage;

an AC-output terminal through which an output of the discharge control circuitry is supplied to the electric device;

charge control circuitry for converting AC voltage of a commercial power source into DC voltage, to thereby charge the battery cell group;

a charging terminal through which electric power of the commercial power source is supplied into the battery cell group; and a case within which the battery cell group, the discharge control circuitry, the AC-output terminal, the charge control circuitry and the charging terminal are housed, wherein the AC-output terminal is connectable with a power-input connector of the electric device which is powered by the commercial power source, and the charging terminal is connectable with a charging connector of the commercial power source, the battery pack further comprising an insertion detector disposed within the case, for detecting insertion of the power-input connector into the AC-output terminal, wherein the discharge control circuitry initiates a discharge control sequence for the battery cell group, if the insertion of the power-input connector is detected, and does not initiate the discharge control sequence, in response to non-detection of the insertion of the power-input connector.

It is noted here that, as used in this specification, the singular form "a," "an," and "the" include plural reference unless the context clearly dictates otherwise. It is also noted that the terms "comprising," "including," and "having" can be used interchangeably.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
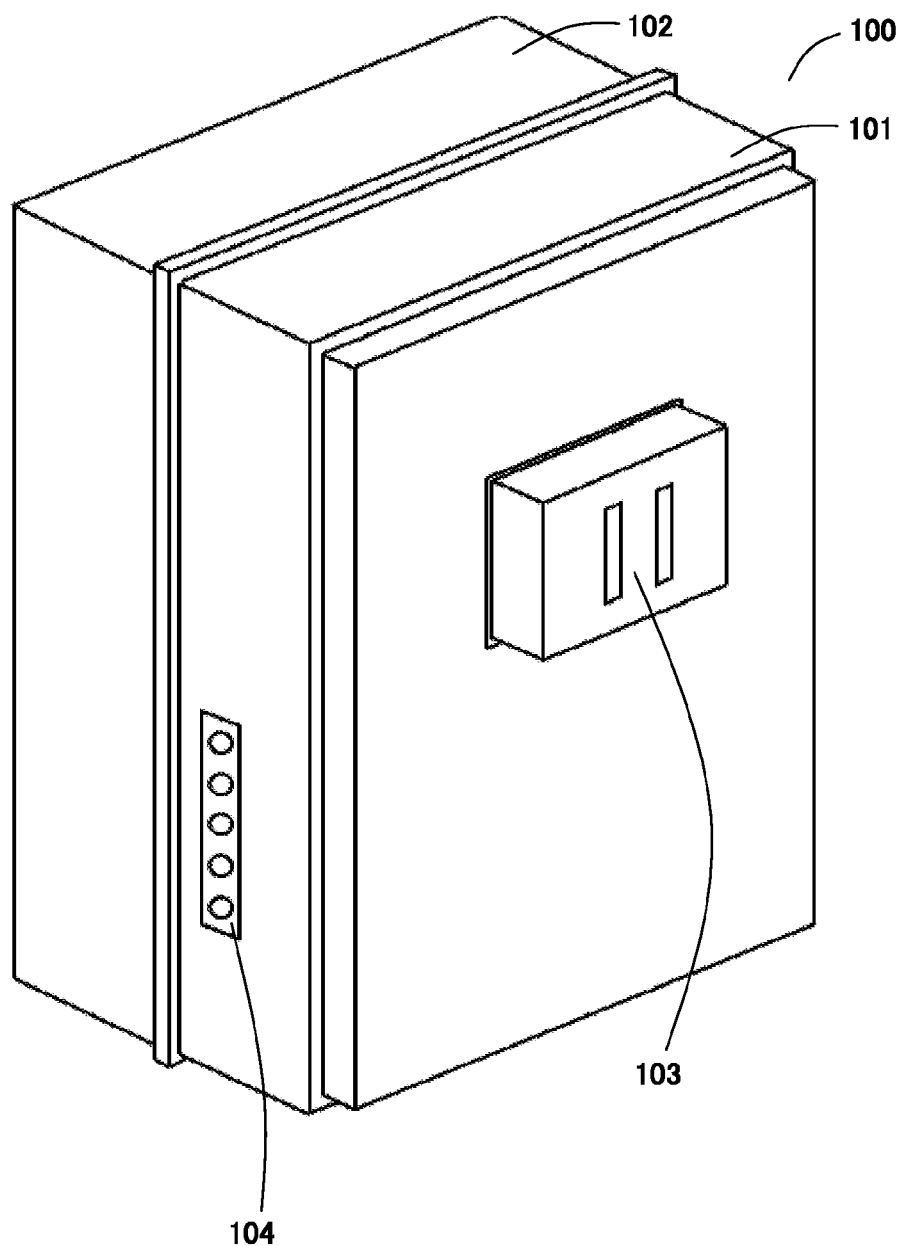
FIG. 1 is a perspective view illustrating the exterior of a battery pack according to an exemplary embodiment of the present invention.

According to the invention, the following modes are provided as illustrative embodiments of the invention:

(1) A battery pack usable as a power source for an electric device, comprising:
a battery cell group in which a plurality of battery cells are interconnected in series;
discharge control circuitry for converting DC voltage of the battery cell group into AC voltage;
an AC-output terminal through which an output of the discharge control circuitry is supplied to the electric device;
charge control circuitry for converting AC voltage of a commercial power source into DC voltage, to thereby charge the battery cell group;
a charging terminal through which electric power of the commercial power source is supplied into the battery cell group; and
a case within which the battery cell group, the discharge control circuitry, the AC-output terminal, the charge control circuitry and the charging terminal are housed,
wherein the AC-output terminal is connectable with a power-input connector of the electric device which is powered by the commercial power source, and
the charging terminal is connectable with a charging connector of the commercial power source,
the battery pack further comprising an insertion detector disposed within the case, for detecting insertion of the power-input connector into the AC-output terminal,
wherein the discharge control circuitry initiates a discharge control sequence for the battery cell group, if the insertion of the power-input connector is detected, and does not initiate the discharge control sequence, in response to non-detection of the insertion of the power-input connector.

(2) The battery pack according to mode (1), wherein the case is configured to include a front case end located on a side where the insertion of the power-input connector occurs, and a rear case end having a proximal end to the front case end, in which the AC-output terminal is disposed, and a distal end from the front case end, in which the charging terminal is disposed,
the battery pack further comprising a partition wall,
wherein the case is constructed by combining together the front and rear case ends with the partition wall interposed between the front and rear case ends.

(3) The battery case according to mode (2), wherein the front case end has a cover which moves with the insertion of the power-input connector,
the partition wall is made of an elastic material, and is pressed and deformed by the cover when the cover is depressed with the insertion of the power-input connector,
the insertion detector includes a cover switch which emits a signal which varies in state between when the partition wall is deformed and when the partition wall is not deformed, to thereby detect deformation of the cover, and
the discharge control circuitry operates depending on the signal of the cover switch.

(4) The battery pack according to any one of modes (1) through (3), further comprising an output-mode changer configured to change an output mode of the AC-output terminal, such that, when the AC voltage is inputted from the commercial power source to the charging terminal, an output mode is selected which allows the inputted AC voltage to be outputted from the AC-output terminal, without running through the charge control circuitry or the discharge control circuitry, and when the AC voltage is not inputted from the commercial power source to the charging terminal, another output mode is selected which allows the voltage outputted from the discharge control circuitry, to be outputted from the AC-output terminal.

(5) The battery pack according to mode (4), further comprising an interrupter for interrupting an electric path from the charging terminal to the AC-output terminal, when a value of current running through the electric path attempts to exceed a limit value over which the output-mode changer is brought into an overload state.

(6) The battery pack according to any one of modes (1) through (5), wherein the discharge control circuitry converts the DC voltage of the battery cell group into the AC voltage which has an effective value substantially the same as that of the voltage of the commercial power source, and which has a frequency substantially the same as that of the voltage of the commercial power source.

Further, the present invention would also provide the following battery pack (a first arrangement).

That is, a battery pack usable as a power source for an electrical device is provided, in which there are housed within a case, (a) a battery cell group in which a plurality of battery cells are interconnected in series; (b) discharge control circuitry for converting DC voltage of the battery cell group into AC voltage; (c) an AC-output terminal through which an output of the discharge control circuitry is supplied to the electric device; (d) charge control circuitry for converting AC voltage of a commercial power source into DC voltage to thereby charge the battery cell group; and (e) a charging terminal through which electric power of the commercial power source is supplied into the battery cell group, wherein the AC-output terminal is connectable with an outlet plug for power-input of the electrical device which is powered by the commercial power source, and the charging terminal is connectable with an outlet of the commercial power source.

An exemplary version of the AC-output terminal has a shape which allows insertion of the outlet plug for power-input of the electric device which is powered by the commercial power source, into the AC-output terminal, with an ability of the AC-power terminal to be directly connected with the outlet plug, which is desirable for improvement in the ease-to-use and for downsizing. In addition, an exemplary version of the charging terminal has a shape which allows the charging terminal to insert into an outlet of the commercial power source, with an ability of the charging terminal to be directly connected the outlet, which is desirable for improvement in the ease-to-use and for downsizing.

Moreover, another exemplary version of the AC-output terminal does not have a shape which allows insertion of the outlet plug for power-input of the electric device which is powered by the commercial power source, into the AC-output terminal, and instead, is electrically connected with the outlet plug using an attachment. Similarly, another exemplary version of the charging terminal does not have a shape which allows the charging terminal to insert into the outlet of the commercial power source, and instead, is electrically connected with the above-described outlet using an attachment.

Still further, the present invention would also provide the following battery pack (a second arrangement).

That is, a battery pack is provided which is constructed according to the first arrangement, the battery pack further comprising a selector configured to select one of an AC voltage of the commercial power source delivered from the charging terminal, and an AC voltage outputted from the discharge control circuitry, as an AC voltage outputted through the AC-output terminal.

Yet further, the present invention would also provide the following battery pack (a third arrangement).

That is to say, a battery pack is provided which is constructed according to the first or second arrangement, wherein the case includes an engagement for allowing the charging terminal of the present battery pack to be connected with an AC-output terminal of another counterpart battery pack that the present battery pack is to be electrically connected with.

Further, the present invention would also provide the following battery pack (a fourth arrangement).

More specifically, a battery pack is provided which is constructed according to any one of the first through third arrangements, the battery pack comprising a memory device configured to store therein the characteristics of the AC voltage which is delivered from the charging terminal, wherein the discharge control circuitry has a changer configured to selectively change the output of the AC-output terminal, based on the stored characteristics of the AC voltage.

The first arrangement would provide a battery pack which is able to be carried and transported to where the commercial power source is not available, which is inexpensive, is easy to be handled, and is able to output power at a level which is comparable to that of the commercial power source.

The second arrangement would provide in addition to the above-described effects of the first arrangement, an intuitive ease-of-use design of the battery pack, owing to a seamless operation of an electric device by allowing the battery pack to output an AC current voltage of the commercial power source through the AC-output terminal, while the charging terminal of the battery pack is connected with the commercial power source.

The third arrangement would provide, in addition to the above-described effects of the first or second arrangement, the ability to electrically interconnect a plurality of the battery packs, to thereby increase a discharge capacity of the battery packs interconnected, and therefore, extend a maximum run time of an electric device, depending on the number of the battery packs interconnected. Additionally, the battery packs, one of which is connected with the commercial power source, and the others of which are connected with the one battery pack, can be charged individually, with the battery packs interconnected. This allows an adaptive selection of the number of battery packs interconnected, to the intended purposes, and provides an intuitive ease-of-use of the battery packs.

The fourth arrangement would provide, in addition to the above-described effects of any one of the first through third arrangements, an independent battery pack with the ability to self-regulate its output level to the locality-dependent power level of the commercial power source, which makes it unnecessary for a user to set the operational condition of the battery pack on a region-by-region basis, resulting in improved convenience.

Several presently preferred embodiments of the invention will be described in more detail by reference to the drawings in which like numerals are used to indicate like elements throughout.

Figure 2:
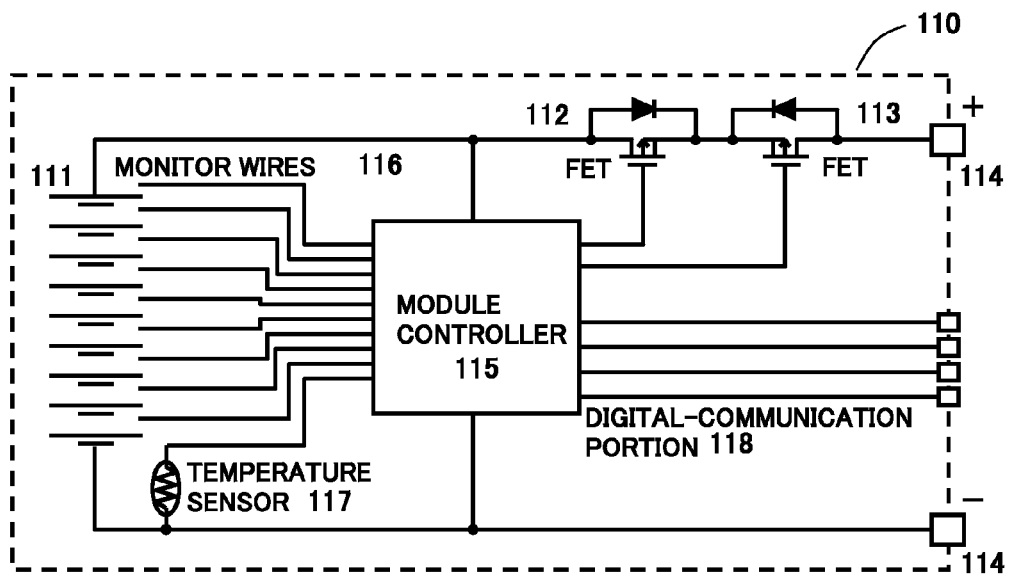
FIG. 2 is a functional block diagram illustrating a representative one of battery modules within the battery pack depicted in FIG. 1.
Figure 3:
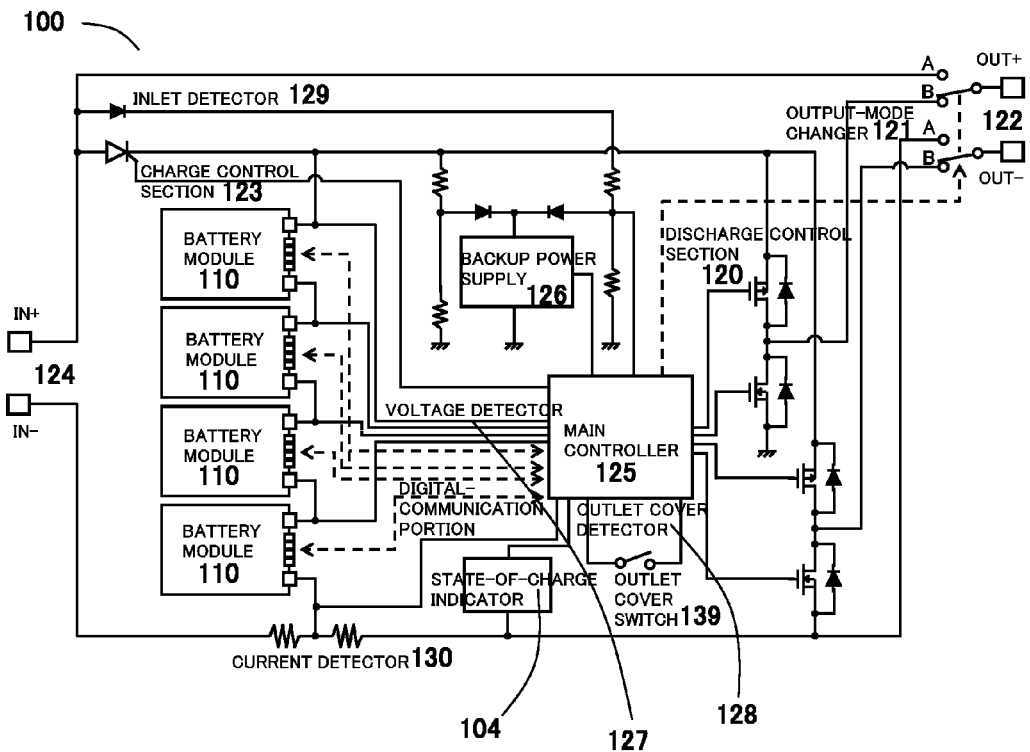
FIG. 3 is a functional block diagram illustrating the battery pack depicted in FIG. 1.
Figure 4:
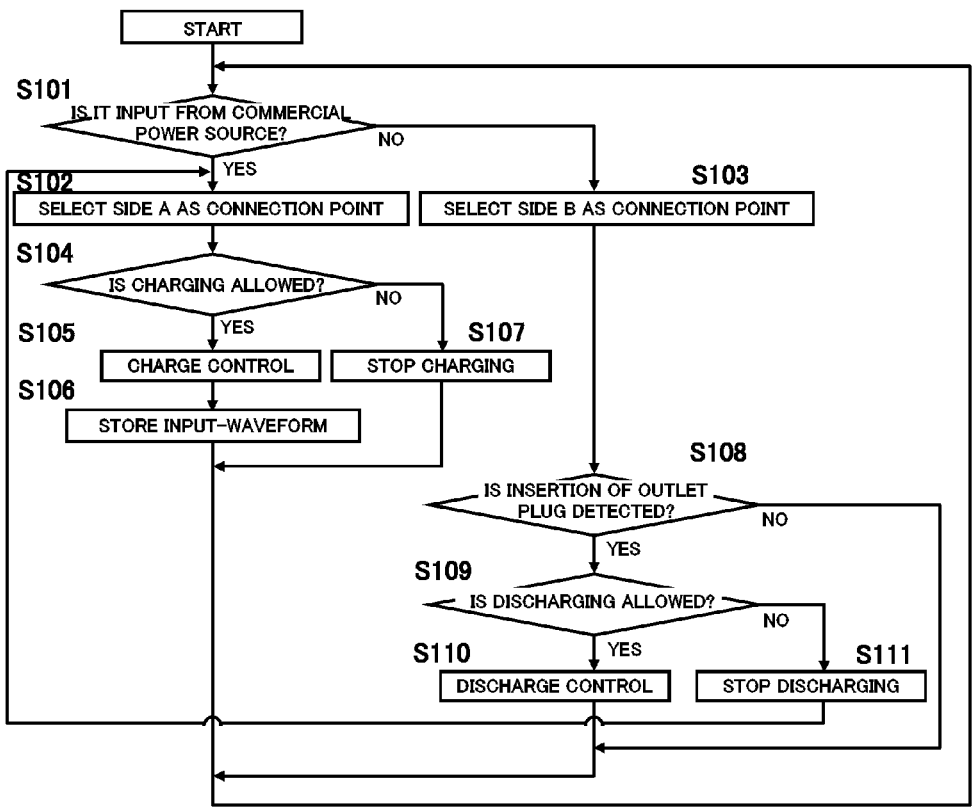
FIG. 4 is a flowchart illustrating a control sequence for the battery pack depicted in FIG. 1.

FIG. 1 schematically illustrates the exterior of a battery pack 100 according to an illustrative embodiment of the present invention, while FIGS. 2 and 3 schematically illustrate the battery pack 100 in functional block diagram. Further, FIG. 4 schematically illustrates control sequence for the battery pack 100, while FIGS. 5 and 6 schematically illustrate the interior structure of the battery pack 100.

FIG. 1 illustrates the exterior of the battery pack 100.

This battery pack 100 contains inner constituent components described later, enclosed with a front end case 101 and a rear end case 102. To the front end case 101, there are attached an outlet cover 103 movable with the movement for insertion of an outlet plug for power input of an electric device, and a state-of-charge indicator 104 for indicating the state of charge of battery cells housed within the battery pack 100. In addition, the rear end case 102 is attached a charging terminal 124 (see FIG. 5).

Figure 5:
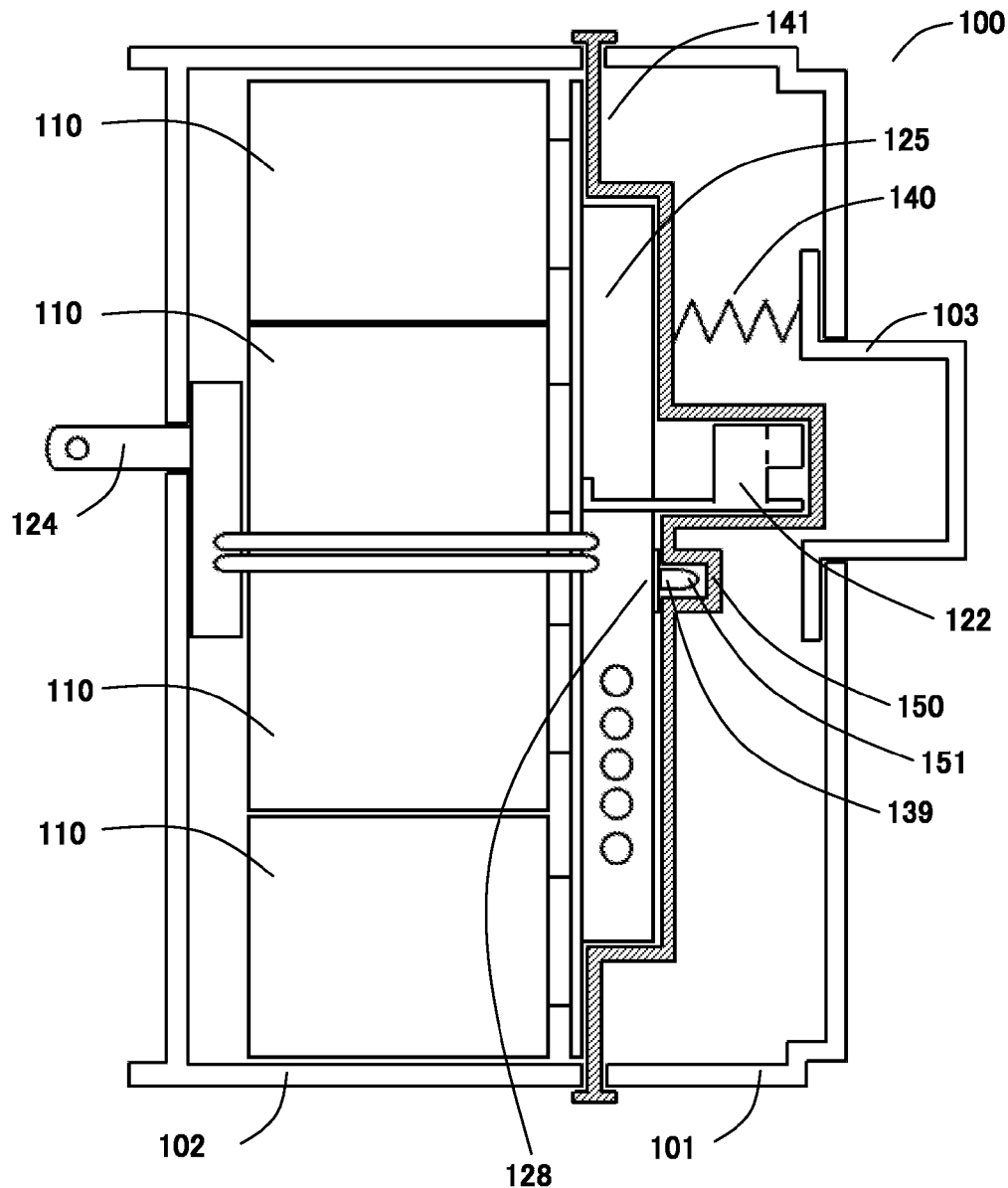
FIG. 5 is a side view illustrating the interior structure of the battery pack depicted in FIG. 1.
Figure 6:
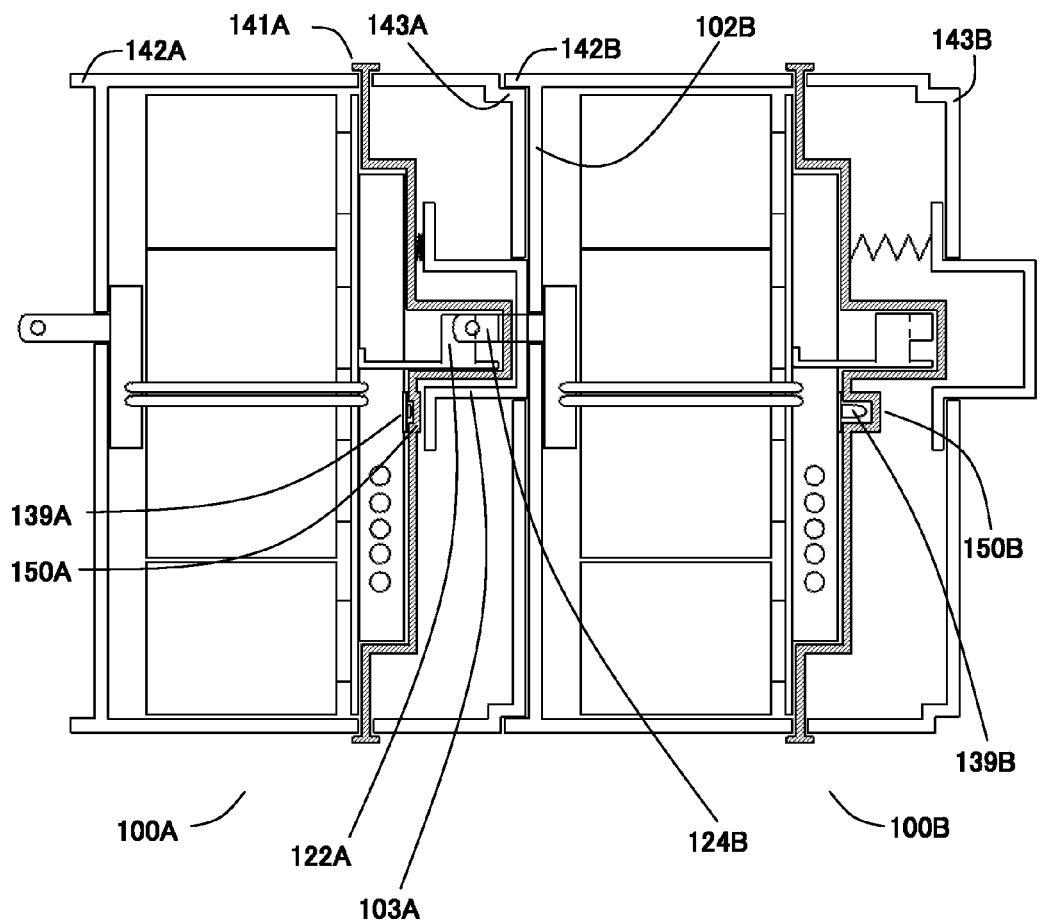
FIG. 6 is a side view illustrating the interior structure of the battery pack depicted in FIG. 1 assembled with another battery pack, when these two battery packs are interconnected.

The outlet plug for power-input of the electric device is an example of a power-input connector described above, and the outlet plug, although not illustrated but is well known, has the identical shape to that of the charging terminal 124 illustrated in FIG. 5.

For a preferred version of the battery pack 100, arrangement will be described in which a plurality of battery modules are housed within the battery pack 100. The total number of the battery cells used in the battery pack 100 is selected so as to allow a DC voltage of a group of serially-connected battery cells to be converted into an AC voltage which has its effective value comparable to that of the commercial power source. Each battery module is constructed such that serially-interconnected battery cells are housed within a battery module case, and such that the number of the serially-interconnected battery cells is smaller than the total number of the battery cells within the battery pack 100. In a preferable arrangement, provided that the total number of the battery modules is equal to or larger than two, the number of the battery cells within each battery module is a selected one of factors or divisors of the total number of the battery cells within the battery pack 100. Each battery cell is preferably in the form of a Li-ion battery, but may cover a wide range of alternatives in the form of rechargeable batteries which can generate electric power within the battery pack 100.

FIG. 2 is a functional block diagram illustrating each battery module 110 within the battery pack 100.

Nine (9) battery cells 111 are electrically interconnected in series and electrically connected with a battery module input-output portion 114 through an FET 112 for battery module charge and an FET 113 for battery module discharge.

A battery module controller 115 detects the status of the battery cells 111 using voltage monitor wires 116 for cell voltage detection and a temperature sensor 117 for cell temperature detection, and performs control using the FETs 112 and 113.

In addition, the battery module controller 115, coupled with a battery-module-controller digital-communication section 118, communicates digitally with a main controller 125 described later.

FIG. 3 is a functional block diagram of the battery pack 100.

Four (4) battery modules 110 which are electrically interconnected in series are electrically connected with AC-output terminal 122 through a discharge control section 120 having four (4) FETs as principal elements, and an output-mode changer 121, and are electrically connected with charging terminal 124 through a charge control section 123 having one (1) SCR as a principal element.

The main controller 125 is powered by a power supply circuit 126 with battery backup function, and is electrically connected with a voltage detector 127 for detection of a voltage of the battery module 110, an outlet insertion detector 128 for detecting movement of an outlet cover 103, a charging terminal input detector 129 for detecting an action that the outlet of the commercial power source is electrically connected with the charging terminal 124, and a current detector 130.

The outlet of the commercial power source is an example of the "charging connector" described above, and as not illustrated but well known, the outlet takes the shape which allows the outlet plug for power-input of the electric device to be fitted in the outlet.

In addition, the main controller 125 communicates digitally with the battery module controller 115 through the battery module-controller digital-communication section 118.

The battery module controller 115 determines whether the charging is permitted and whether the discharging is permitted, based on the voltage and the temperature of each battery cell 111 and information received from the main controller 115, and controls the FET 112 and the FET 113, to thereby selectively perform an input operation, an output operation and a stop operation.

In addition, the battery module controller 115 sends to the main controller 125 the above-described state of each battery cell 111 and control information by digital communications.

The main controller 125 determines whether the charging is permitted and the discharging is permitted, based on the voltage and the current of each battery module 110 and information received from the battery modules 110, and controls the charge control section 123 and the discharge control section 120, to thereby selectively perform an input operation, an output operation and a stop operation. In addition, the main controller 125 sends to the battery module controller 125 the determination result as to whether the charging is permitted and the discharging is permitted.

The discharge control section 120 is a well-known circuit for selectively turning ON and OFF four (4) FETs (each FET is equivalent to a circuit in which a switch and a diode for bypass thereof are electrically interconnected in parallel) which are electrically connected between the battery cells 111 and the AC-output terminal 122 and act as a plurality of switches, to thereby alternately change a direction in which the current flows from the battery cells 111 to the AC-output terminal 122, and, as a result, convert the DC voltage of the battery cells 111 into the AC voltage.

The discharge control section 120, for example, alternately achieves the following states, based on the frequency of the commercial power source:

a non-output state in which all of the first FET, the second FET, the third FET and the fourth FET, which appear in the order from the top in FIG. 3 are turned OFF;

a positive output state in which both the first FET and the fourth FET are turned ON, while both the second FET and the third FET are turned OFF; and a negative output state in which both the first FET and the fourth FET are turned OFF, while both the second FET and the third FET are turned ON. Because of this, a pseudo sine wave is outputted such that average points of successive pulses approximate a sine waveform of the commercial power source.

When the Li-ion battery cell in fully charged has a set voltage of 4.2 V, in one embodiment as shown in FIGS. 2 and 3, the DC voltage of the battery module group in the form of a serial connection of four (4) battery modules 110 amounts to 151.2 V when fully charged. The discharge control section 120 converts the DC voltage of 151.2 V an AC voltage which is equivalent to, for example, that of the commercial power source having an effective value of 100 V and a frequency of 60 Hz.

It is added that the battery pack 100 can accommodate, but not limited to, as described, an alternative current having 100 V and 60 Hz, and the battery pack 100 can accommodate any type of an alternate current voltage commercially available in each geographical area, by tuning the combined factor of the number of the battery modules 110 within the battery pack 100, the number of the battery cells 111 within the battery module 110 and the output control property of the discharge control section 120.

The discharge control section 120 outputs an AC voltage which is equivalent to that of the commercial power source which, for example, forms a sine wave or a square wave. Notably, if the effective value of the output voltage is controlled so as to be maintained at a constant value which is equivalent to that of the commercial power source, the user can use the battery pack 100 without noticing any drop in the output level due to a decrease in the charge amount of the battery cell group.

In addition, in order to keep the waveform of the AC output close to the sine waveform of the voltage of the commercial power source until the voltage level starts dropping due to a decrease in the charge amount of the battery cell group, the DC voltage of the battery cell group, if it is lower than that of the commercial power source, may be boosted up using a booster circuit and then converted into an AC voltage.

The main controller 125 and the battery module controller 115 detect a state in which the battery cells 111, etc. are not permitted to be discharged, such as overdischarging, high temperature and overload, and selectively perform an output operation and an operation for stopping the outputting. In addition, the battery pack 100 has an outlet insertion detector 128 which moves in synchronization with movement of the outlet cover 103, and therefore, the main controller 125 detects a state in which the outlet plug of the electrical device, etc. is electrically connected to the AC output terminal 122, and selectively performs an output operation and an operation to stop the outputting.

The charge control section 123 converts the AC voltage of the commercial power source, etc. into a DC voltage to charge the battery cell group. Notably, if the battery cells made of Li-ion battery are charged, the charge control section 123 performs current control such that the charging current does not exceed an upper limit of current, until the battery cell voltage reaches a predetermined voltage, and such that the battery cell voltage, while being charged, does not exceed the predetermined voltage after the battery cell voltage has reached the predetermined voltage. In a preferable example, the charge control section 123 detects a battery cell voltage and a charging current, and controls the firing angles of an SCR so that the charging current and the charging voltage which are suitable for the state of the battery cells can show their respective target values.

The main controller 125 and the battery module controller 115 detect a state in which the battery cells 111, etc. are not permitted to be charged, due to such as overcharging, high temperature and charging with over-current, and selectively perform a charge operation and an operation to block the charging. In addition, the battery pack 100 has a charging-terminal input detector 129, and therefore, the main controller 125 detects a state in which a voltage high enough to charge is inputted into the charging terminal 124, and selectively performs a charge operation and an operation to block the charging.

An output-mode changer 121 of the battery pack 100 selects one of a side A of the output-mode changer 121, that is, the side of the charging terminal 124, a side B of the output-mode of the changer 121, that is, the side of the discharge control section 120, and connect a selected one of sides A and B with the AC-output terminal 122, based on a control sequence described below. This allows the AC-output terminal 122 to output a selected one of an AC voltage which has been inputted from the commercial power source, etc. through the charging terminal 124, and an AC voltage into which the discharge control section 120 has converted the DC voltage of the battery cell group.

FIG. 4 is a flowchart illustrating the control sequence of the battery pack 100.

As indicated at step S101, if a main controller 125 detects a state in which an AC voltage is inputted from the commercial power source, etc., to a charging terminal 124, then the process proceeds to step S102. If, however, the main controller 125 does not detect the above-described state, then the process proceeds to step S103.

At step S102, the output-mode changer 121 selects the side A for connection. This forms a conducting path from the charging terminal 124 to the AC-output terminal 122, and a charging path from the charging terminal 124 to the battery module 110 through the charge control section 123.

It is added that, in an alternative, if, in the above-described state, the main controller 125 determines that current flowing through the conducting path from the charging terminal 124 to the AC-output terminal 122 is approaching a value which causes load on the output-mode changer 121 or the like to be in an overload condition, then the output-mode changer 121 may select the side B for connection to interrupt or disconnect the above-described conducting path. In addition, as the function to interrupt as described above, an interrupter such as a circuit breaker may be added between the charging terminal 124 and the output-mode changer 121.

At step S104, the main controller 125 and the battery module controller 115 determine whether the battery cells 111 or the like can be charged or not, and perform a selected one of the charge control at step S105 and the stop of charging at step S107. It is added that, when an outlet plug for power-input of the electric device located outside of the battery pack 100 is electrically connected with the AC-output terminal 122 during the charging at step S105, the battery pack 100 can directly supply to the above-described electric device, the AC electricity of the commercial power source or the like, which has been supplied through the charging terminal 124. Moreover, after the stop of the charging at step S105, the main controller 125, at step S106, stores for preservation AC voltage characteristics such as its effective voltage or its frequency, which has been inputted through the charging terminal 124.

At step S103, the output-mode changer 121 selects the side B for connection. This forms a charging path from the charging terminal 124 to the battery module 110 through the charge control section 123, and a discharging path from the battery module 110 to the AC-output terminal 122 through the discharge control section 120.

At step S108, if the main controller 125 detects insertion of the outlet plug for power-input of the electric device located outside the battery pack 100, into the AC-output terminal 122 of the battery pack 100 via an outlet cover switch 139 shown in FIG. 3 (described in more detail below by reference to FIG. 5), then the process proceeds to step S109.

At step S109, the main controller 125 and the battery module controller 115 determine whether the battery cells 111 or the like can be discharged or not, and perform a selected one of the discharge control at step S110 and the stop of discharging at step S111.

In the discharge control process at step S110, the output (e.g., output mode) of the AC-output terminal 122 is changed, based on the AC voltage characteristics which have been stored at step S106.

It is added that the above-described change of the output may alternatively be achieved by selection using, for example, a switch disposed in the battery pack 100. After the discharging stops at step S111, the process proceeds to step S102 to charge the battery cells 111, because the charge of the battery cells 111 is empty.

FIG. 5 is a side view illustrating the interior structure of the battery pack 100.

Four (4) battery modules 110 each of which is electrically connected with the main controller 125, the charging terminal 124, the AC-output terminal 122, the outlet cover 103, an outlet cover spring 140, etc. are housed within the front end case 101 and the rear end case 102.

It is added that a partition wall 141 is interposed between the above-described front and rear end cases 101 and 102, which prevents any foreign matters from entering the main controller 125 and the battery modules 110 through an undesirable gap between the outlet cover 103 and the front end case 101, or the like.

In a preferable implementation, the partition wall 141 is made of an electrically-insulating elastic material such as rubber, and has an opening or cut located only at a position which allows the outlet plug to be inserted into the AC-output terminal 122.

As shown in FIG. 5, in an attempt to insert the outlet plug for power-input of the electric device into the AC-output terminal 122, a main body of the outlet plug, prior to the insertion, is brought into physical contact with the outlet cover 103 and then presses the outlet cover 103. Eventually, this outlet cover 103 is brought into physical contact with a protrusion 150 (behind which a movable member 151 of an outlet cover switch 139 is placed) of the partition wall 141 made of elastic material.

Upon further forward movement of the outlet cover 103, as the outlet cover 103 moves forward, the protrusion 150 of the partition wall 141 is elastically deformed or crushed. As a result, the outlet cover switch 139 is turned ON, and therefore, the process enters a discharge control sequence.

The outlet insertion detector 128 is an example of the above-described "insertion detector," and the outlet cover switch 139 is an example of the above-described "cover switch."

The outlet cover switch 139 has the movable member 151 which moves with movement of the partition wall 141 while being pressed by the partition wall 141, and is designed so as to be switched into one of an ON state and an OFF state, based on the position of the movable member 151. The position of the movable member 151 is selectable between an initial position, and an operating position, as the partition wall 141 is shifted between an initial state shown in FIG. 5 (shown as the protrusion 150B in FIG. 6), and an elastically-deformed state (crushed) shown as the protrusion 150A of the partition wall 141A in FIG. 6.

FIG. 6 is a side view illustrating the interior structure of a battery pack 100A with a battery pack 100B connected therewith.

Movement of a rear case engagement 142B of the battery pack 100B along a front case engagement 143A of the battery pack 100A, and insertion of a charging terminal 124B of the battery pack 100B into a discharge output terminal 122A of the battery pack 100A result in electrical and mechanical connection between two battery packs 100A and 100B.

It is added that FIG. 6 illustrates the battery pack 100A on a left-hand side, with the protrusion 150A of the partition wall 141A elastically crushed by the outlet cover 103A. However, in FIG. 6, the forward movement of the outlet cover 103A is caused not by contact of the main body of the outlet plug for power-input of the electric device onto the outlet cover 103A, but by contact of the rear end case 102B of the counterpart battery pack 100B onto the outlet cover 103A.

Like a rear case engagement 142B as shown in FIG. 6, at an engagement portion of one battery pack which is engaged with another battery pack, there is provided a ridge (e.g., a peripheral wall, an annular ridge, etc.) which projects in a direction (e.g., a normal or perpendicular direction to the end face) different from a direction in which a plane on which the battery packs 100A and 100B contact with each other. This prevents an outward extension of a plane on which terminal connections of the two battery packs 100A and 100B contact with each other, from direct exposure to outside the battery packs 100A and 100B. As a result, this prevents any foreign matters from direct entry into the terminal connections from outside of the battery packs 100A and 100B.

Next, another embodiment of the present invention will be described below. The common elements of the present embodiment to those in the foregoing embodiment, however, will be referenced by the same reference numerals, without redundant description.

In the present embodiment, the connection arrangement as employed between the battery packs 100A and 100B would allow connection between, not limited to two battery packs as shown in FIG. 6, three battery packs 100 or more. Each one of the interconnected battery packs 100 is controlled independently of other battery packs 100, for the purposes of charging, discharging and stopping the charging according to the control sequence as shown in FIG. 4. Each one of the interconnected battery packs 100 is charged by using an AC voltage supplied through the charging terminal 124, from a selected one of the commercial power source, and another battery pack 100 which has been electrically connected to the each one battery pack 100 on the side of the charging terminal 124 of the each one battery pack 100.

In addition, each one of the interconnected battery packs 100 outputs through the AC-output terminal 122, a selected one of an AC voltage of the commercial power source which has been electrically connected to the each one battery pack 100 on the side of the charging terminal 124 of the each one battery pack 100, an AC voltage of another battery pack 100 which has been electrically connected to the each one battery pack 100 on the side of the charging terminal 124 of the charged battery pack 100, and an AC voltage into which a DC voltage of the battery cell group of the each one battery pack 100 has been converted. The AC-output voltage which has been outputted through the AC-output terminal 122 is supplied to a selected one of the electric device which has been electrically connected to the each one battery pack 100 on the side of the AC-output terminal 122 of the each one battery pack and another battery pack 100.

It is evident from the foregoing that, for the interconnected battery packs 100 according to the present embodiment, the state of charge of each battery pack 100 is automatically regulated, which results in a variable discharge capacity depending on the number of the interconnected battery packs 100. That is, this provides a method having an improved ease-to-use which allows a user to choose the desired number of the interconnected battery packs depending on the desired run time of an electric device.

In an alternative implementation, the connection between the battery packs 100 may be configured so as to have a hook-button and an engagement portion which is linked with the hook-button, to thereby prevent the interconnected battery packs 100 from being disconnected until the user manipulates the hook-button for release, which can improve its ease-to-use.

In a still alternative implementation, the above-described outlet plug 124 may be of a type in which, for example, an additional element is added which allows the outlet plug to be laterally tilted 90 degrees from the original orientation of the outlet plug depicted in FIG. 5, so that the outlet plug can be housed inside the surface of the entire casing in an orientation along the back face of the entire casing, which can render the outlet plug when not in use, resistant to possible external force.

In a still yet alternative implementation, each and every battery pack 100 has at least one additional AC-output terminal 122, and each battery pack 100 has the charging terminal 124 which is located so as to be engaged with any one of the entire AC-output terminals 122 of the counterpart battery pack 100 (i.e., another battery pack 100 which is to be connected with the each battery pack 100), which can improve its ease-to-use.

In an additional alternative implementation, each battery pack 100 may have a communication device which communicates with each of a plurality of potential counterpart battery packs 100, each battery pack 100 may recognize, as a result of the communication, various factors of the plurality of the potential counterpart battery packs 100, such as the number of charge/discharge cycles, the amount of the state-of-charge, or the state of the charge/discharge control, of each battery pack 100, and each battery pack 100 may perform entire control based on the recognized factors, which provides improved performance and ease-to-use of the battery packs 100.

In a still additional alternative implementation, one of the interconnected battery packs 100 which has determined that it has a smaller number of the charge/discharge cycles than that of the counterpart battery pack 100, or that it has a larger quantity of the state-of-charge than that of the counterpart battery pack 100, may perform discharge control under higher priorities. In this implementation, if the one battery pack 100 has not made the same determination, then the one battery pack 100 does not start any discharge control.

That is, the interconnected battery packs 100 sequentially perform the discharge control, in the decreasing order of the numbers of the charge/discharge cycles of the battery packs 100, or in the increasing order of the amounts of the state-of-charge of the battery packs 100.

This arrangement can prevent a particular one of the battery packs 100 from continuing charge/discharge and therefore quickly reducing the amount of the state-of-charge of the particular battery pack 100. This arrangement results in reduced life-time of each battery pack 100 and storage of a substantial amount of charge in each battery pack 100 just after disconnection or release from other battery packs 100.

In addition, notably, one of the interconnected battery packs 100, which is located close to the connection side of the commercial power source, may supply an AC voltage supplied from the commercial power source or an AC voltage produced as a result of the conversion of the DC voltage of the battery cells, to remaining ones of the battery packs 100 which are positioned on the side of the AC-output terminal 122 of the one battery pack 100, so that the remaining ones of the battery packs 100 can be charged at the same time as the operation of the one battery pack 100.

That is, the larger the number of the battery packs 100 which have to be charged simultaneously, and, the load current of the electric device which is used simultaneously, the more the need for relatively increasing the current capacity of one of the battery packs 100 which is positioned close to the commercial power source. Use of the battery packs 100 above the current capacity causes a failure of the battery packs 100.

For this reason, in an exemplary implementation, one of the interconnected battery packs 100 which is scheduled to start charging (i.e., charging-scheduled battery pack) may identify another one of the interconnected battery packs 100 which has the maximum current value among them, using the result of the above-described communication. If the sum of the maximum current value and a charging current value required by the charging-scheduled battery pack 100 does not exceed an allowable current value for one of the battery packs 100 which has the maximum current value (i.e., the maximum load), then the charging-scheduled battery pack 100 may actually start the charging, and, if the sum exceeds the allowable current value, then the charge-scheduled battery pack 100 may wait until the charging is permitted, or may start the charging after reduction in the charging current value so as not to exceed the allowable current value.

In another exemplary implementation in which two or more of the interconnected battery packs 100 are scheduled to start charging (i.e., charging-scheduled battery packs), each charging-scheduled battery pack 100 may start charging, if it determines, using the result of the above-described communication, that is has a smaller number of the charge/discharge cycles than the counterpart battery pack 100, then the each charging-scheduled battery pack 100 may start charging under higher priorities. This arrangement can prevent the battery packs 100 from being failed due to use of excessive current above the current capacity because of interconnection of battery packs 100 with an unlimited total number, without requiring any increase in the current capacity of each battery pack 100.

Reference throughout the specification to "one embodiment" or "an embodiment" means that a particular feature, structure, or characteristic described in connection with the embodiment is included in at least one embodiment of the present invention.

Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, the claims following the Detailed Description are hereby expressly incorporated into this Detailed Description, with each claim standing on its own as a separate embodiment of this invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A battery pack usable as a power source for an electric device, comprising:
    a battery cell group in which a plurality of battery cells are interconnected in series;
    discharge control circuitry for converting DC voltage of the battery cell group into AC voltage;
    an AC-output terminal through which an output of the discharge control circuitry is supplied to the electric device;
    charge control circuitry for converting AC voltage of a commercial power source into DC voltage, to thereby charge the battery cell group;
    a charging terminal through which electric power of the commercial power source is supplied into the battery cell group; and
    a case within which the battery cell group, the discharge control circuitry, the AC-output terminal, the charge control circuitry and the charging terminal are housed,
    wherein the AC-output terminal is connectable with a power-input connector of the electric device which is powered by the commercial power source, and
    the charging terminal is connectable with a charging connector of the commercial power source,
    the battery pack further comprising an insertion detector disposed within the case, for detecting insertion of the power-input connector into the AC-output terminal,
    wherein the discharge control circuitry initiates a discharge control sequence for the battery cell group, if the insertion of the power-input connector is detected, and does not initiate the discharge control sequence, in response to non-detection of the insertion of the power-input connector.

2. The battery pack according to claim 1, wherein the case is configured to include a front case end located on a side where the insertion of the power-input connector occurs, and a rear case end having a proximal end to the front case end, in which the AC-output terminal is disposed, and a distal end from the front case end, in which the charging terminal is disposed,
    the battery pack further comprising a partition wall,
    wherein the case is constructed by combining together the front and rear case ends with the partition wall interposed between the front and rear case ends.

3. The battery pack according to claim 2, wherein the front case end has a cover which moves with the insertion of the power-input connector,
    the partition wall is made of an elastic material, and is pressed and deformed by the cover when the cover is depressed with the insertion of the power-input connector,
    the insertion detector includes a cover switch which emits a signal which varies in state between when the partition wall is deformed and when the partition wall is not deformed, to thereby detect deformation of the cover, and
    the discharge control circuitry operates depending on the signal of the cover switch.

4. The battery pack according to claim 1, further comprising an output-mode changer configured to change an output mode of the AC-output terminal, such that, when the AC voltage is inputted from the commercial power source to the charging terminal, an output mode is selected which allows the inputted AC voltage to be outputted from the AC-output terminal, without running through the charge control circuitry or the discharge control circuitry, and when the AC voltage is not inputted from the commercial power source to the charging terminal, another output mode is selected which allows the voltage outputted from the discharge control circuitry, to be outputted from the AC-output terminal.

5. The battery pack according to claim 4, further comprising an interrupter for interrupting an electric path from the charging terminal to the AC-output terminal, when a value of current running through the electric path attempts to exceed a limit value over which the output-mode changer is brought into an overload state.

6. The battery pack according to claim 1, wherein the discharge control circuitry converts the DC voltage of the battery cell group into the AC voltage which has an effective value substantially the same as that of the voltage of the commercial power source, and which has a frequency substantially the same as that of the voltage of the commercial power source.

* * * * *